United States Patent
García Nieto et al.

(10) Patent No.: US 10,532,807 B2
(45) Date of Patent: Jan. 14, 2020

(54) LEADING EDGE WITH LAMINAR FLOW CONTROL AND MANUFACTURING METHOD THEREOF

(71) Applicant: Airbus Operations, S.L., Getafe (Madrid) (ES)

(72) Inventors: Carlos García Nieto, Madrid (ES); Enrique Guinaldo Fernández, Madrid (ES); Pablo Cebolla Garrofe, Madrid (ES); Iker Vélez De Mendizabal Alonso, Madrid (ES); Soledad Crespo Peña, Madrid (ES); Francisco Javier Honorato Ruiz, Madrid (ES); Álvaro Torres Salas, Madrid (ES); Álvaro Calero Casanova, Madrid (ES)

(73) Assignee: Airbus Operations, S.L. (ES)

( * ) Notice: Subject to any disclaimer, the term of this patent is extended or adjusted under 35 U.S.C. 154(b) by 433 days.

(21) Appl. No.: 15/402,520

(22) Filed: Jan. 10, 2017

(65) Prior Publication Data

US 2017/0197706 A1    Jul. 13, 2017

(30) Foreign Application Priority Data

Jan. 12, 2016    (EP) .................................... 16382009

(51) Int. Cl.
 *B64C 21/06* (2006.01)
 *B64F 5/00* (2017.01)
 (Continued)

(52) U.S. Cl.
 CPC .............. *B64C 21/06* (2013.01); *B64C 3/182* (2013.01); *B64C 3/26* (2013.01); *B64F 5/00* (2013.01);
 (Continued)

(58) Field of Classification Search
 CPC ....... B64C 21/06; B64C 21/02; B64C 21/025; B64C 21/04; B64C 3/26; B64C 3/182;
 (Continued)

(56) References Cited

U.S. PATENT DOCUMENTS

| 4,171,785 A | 10/1979 | Isenberg |
| 6,050,523 A * | 4/2000 | Kraenzien ................ B64C 9/00 |
| | | 244/123.1 |

(Continued)

FOREIGN PATENT DOCUMENTS

| EP | 0436243 A2 | 7/1991 |
| EP | 2 886 452 A1 | 6/2015 |

OTHER PUBLICATIONS

EP 16382009.5 Search Report dated Jul. 5, 2016.

*Primary Examiner* — Philip J Bonzell
*Assistant Examiner* — Tye William Abell
(74) *Attorney, Agent, or Firm* — Lerner, David, Littenberg, Krumholz & Mentlik, LLP

(57) ABSTRACT

A leading edge section with laminar flow control includes: a perforated outer skin, a perforated inner skin, and a plurality of suction chambers formed between the outer skin and the inner skin. The leading edge section includes a plurality of stringers span-wise arranged at the leading edge section, and integrally formed with the outer skin, such that the inner skin is joined to the stringers. A method for manufacturing a leading edge section integrating a laminar flow control system is described, wherein a perforated inner skin is joined with a perforated outer skin having a plurality of stringers integrally formed with the outer skin, such that suction chambers are defined by a part of the outer skin, a part of the inner skin and a pair of stringers.

9 Claims, 4 Drawing Sheets

(51) Int. Cl.
*B64C 3/18* (2006.01)
*B64C 3/26* (2006.01)
*B64C 1/00* (2006.01)

(52) U.S. Cl.
CPC ................ *B64C 2001/0072* (2013.01); *B64C 2001/0081* (2013.01)

(58) Field of Classification Search
CPC ......... B64C 3/185; B64C 3/187; B64D 15/02; B64D 15/04
See application file for complete search history.

(56) References Cited

U.S. PATENT DOCUMENTS

| | | | |
|---|---|---|---|
| 7,922,126 B2 * | 4/2011 | Meister | ................ B64C 21/025 244/123.12 |
| 2001/0013173 A1 | 8/2001 | Mertens et al. | |
| 2009/0212165 A1 * | 8/2009 | Parikh | .................... B64C 21/06 244/209 |
| 2009/0266937 A1 * | 10/2009 | Frankenberger | ........ B64C 21/06 244/209 |
| 2010/0294892 A1 * | 11/2010 | Syassen | .................. B64C 21/06 244/209 |
| 2012/0187252 A1 * | 7/2012 | Gerber | ...................... B64C 5/06 244/209 |
| 2016/0137292 A1 * | 5/2016 | Teich | ...................... B64C 21/06 244/130 |
| 2017/0217569 A1 * | 8/2017 | Gueuning | ............... B64C 21/06 |

* cited by examiner

A)

B)

C)

LEADING EDGE WITH LAMINAR FLOW CONTROL AND MANUFACTURING METHOD THEREOF

FIELD OF THE INVENTION

The present invention refers to a configuration and a manufacturing method of a leading edge with a hybrid laminar flow control, for aircraft lifting surfaces such as wings or Horizontal Tail Planes (HTP).

An aspect of the present invention may provide a leading edge design integrating a Hybrid Laminar Flow Control (HLFC), which allows the integration of the components to implement the (HLFC), as structural elements of the leading edge.

Another aspect of the present invention may provide a (HLFC) leading edge design with which can be fully accessed, both during manufacturing and in service, in order to ease repair and maintenance tasks.

Yet another aspect of the invention may provide a (HLFC) leading edge which can be manufactured with different combination of materials and production techniques, such as the manufacturing process and associated tooling are simplified.

BACKGROUND OF THE INVENTION

Aircraft manufacturers are continuously seeking ways of increasing aircraft performance and reducing fuel consumption. One of the main factors when it comes to improving aircraft performance, is the aerodynamic drag on aircraft surfaces.

A significant amount of aircraft drag is caused by turbulent air flow on the aircraft exposed surfaces during flight. Near the aircraft skin the air flow is turbulent mainly due to the following reasons:
  laminar flow is unstable with respect to small perturbations, and
  surface imperfections may cause early transition from laminar to turbulence.

Since air laminar boundary layers create less friction at the aircraft surfaces than air turbulent boundary layers, one technique for reducing aircraft drag is to form and maintain a laminar boundary layer over the aircraft external surfaces.

Laminar Flow reduces friction drag and implementation on vertical tail planes (VTP) and horizontal tail planes (HTP), would potentially lead to up to 2% aircraft drag reduction.

Current existing methods to form and maintain a laminar flow are:
  Natural Laminar Flow (NLF) is obtained by a profile that produces a progressive pressure drop (i. e. favourable gradient) resulting in flow acceleration and a delay in transition to turbulence approximately at the point of minimum pressure.
  Laminar Flow Control (LFC) which relies on a relatively small amount of air being sucked through a perforated skin to suppress boundary layer instabilities.
  Hybrid Laminar Flow Control (HLFC) is a combination of full LFC and NLF as shown in FIG. 1, which relies on:
    1. suction being applied to the leading edge (1) 10-20% of the chord (i. e. ahead of the front spar), to stabilize the flow, and
    2. a correctly profiled wing or lifting surface contour, to generate a suitable pressure gradient, thus maintaining the laminar flow aft of the suction area.

Transition from laminar to turbulent flow, is delayed by this technique, and may even occur after the 50% chord location, due to the combined effects of the local pressure gradient and Reynolds number.

FIG. 2 shows a laminar flow control system, to actuate on the boundary layer by bleeding air through a micro-perforated skin surface (3) at the leading edge (1). Typically, the diameter of the micro-perforations is within the range 10-100 microns. The air is ducted beneath the skin (3) through a network of chambers (2) located at the leading edge section (D-box) (1), and finally exhausted, through a main chamber or a suction duct (4).

As suction is limited to the forward part of the wing or lifting surface, HLFC avoids many of the structural problems associated with LFC. It also requires a smaller and lighter suction system. These advantages make HLFC more suitable than full LFC for subsonic transport aircraft. The HLFC technology has also good aerodynamic performance in the fully turbulent mode, which is a significant advantage.

This air suction system of the leading edge (1) requires a differential pressure distribution over the leading edge surface. This differential pressure distribution is achieved by providing chambers of different size, to obtain different pressure within each chamber, as shown more clearly in FIG. 2C.

As shown in FIG. 3, a conventional leading edge configuration with laminar flow control, is formed by a micro-perforated outer skin (3), a perforated inner skin (5) and a set of transversal walls (6) fixed to outer and inner skins at specific locations to form chambers of different sizes, to create the chambers allowing air circulation through them.

One of the main problems involved in the implementation of the HLFC technique, is that the components of the leading edge have to be manufactured separately and then assembled together. In addition to this, assembly by means of mechanical joints may reduce the effective outer suction surface. Thus, manufacturing and assembly processes of these multi-chambered structures with laminar flow control, are complicated and expensive. Furthermore, the weight penalty involved is significantly high due to the metallic materials implemented and the length of all mechanical joints used for building the leading edge, penalizing so much the aircraft performances that all HLFC benefits would be overcame and, as consequence, its implementation may be discarded.

BRIEF SUMMARY OF THE INVENTION

The present invention relates to a leading edge for an aircraft wing or stabilizer (a HTP, or a VTP) and to its manufacturing method.

An aspect of the invention refers to a leading edge section integrating a laminar flow control architecture, preferably a (HLFC), which typically comprises a perforated (micro-drilled) outer skin shaped with an aerodynamic leading edge profile, a perforated inner skin internally arranged with respect to the outer skin, and a plurality of suction chambers formed between the outer skin and the inner skin, such as an exterior region of the leading edge section is communicated with an interior region of the leading edge section through said suction chambers to implement the laminar flow control system. The suction chambers are arranged and dimensioned to obtain different pressure gradients over the outer wet surface of the leading edge, such as, via the micro-drilled outer skin, different suction pressures are so achieved on different areas of the wet surface of the leading edge.

Preferably, the inner skin is configured with a similar shape than the outer skin, and the suction chambers are arranged consecutively one after another following the contour of a major part of the leading edge section.

The leading edge section according to an embodiment of the invention, further comprises a plurality of stringers span-wise arranged at the leading edge section, and integrally joined or formed with the outer skin. The stringers are configured as structural elements to withstand loads at the leading edge.

The inner skin is joined to the stringers, such as the suctions chambers are defined by a part of the outer skin, a part of the inner skin and a pair of consecutive stringers. Therefore, the stringers have two roles, first as structural elements of the leading edge, and second to configure the suction chambers of the (HLFC) architecture.

As it can be noted, the leading edge section of the invention is formed by two separate main parts, in one hand the outer skin with integrated stringers and in the other hand the inner skin. These two main parts are conformed separately and then attached together.

Some of the advantages derived from this particular configuration of the invention are:
- the two main parts can be obtained with different combinations of materials and manufacturing processed, such as the manufacturing tooling required for each part is simplified,
- the leading edge components can be fully accessed for inspection and repair.
- since the two main parts can be drilled before their assembly, the drilling process of the outer and inner skins are simplified.

In one preferred embodiment of the invention, the inner skin comprises a set of individual U-shaped (in a cross-sectional view) members, such as each member has two short sides and a central side between the short sides, wherein the central side is perforated. The U-shaped members are consecutively arranged one after another to configure the inner skin, and in such a way that a free edge of each stringer is placed between two short sides of two consecutive U-shaped members and it is fastened (bolted or riveted) to said short sides.

The outer skin and the stringers can be metallic, and in this case the stringers are welded to the outer skin. Alternatively, the outer skin and the stringers are obtained from a Fiber Reinforced Composite material or plastic, and the outer skin and the stringers are co-cured together. In these two alternatives, it can be said that the stringers and the outer skin are integrally formed or joined or joined together.

In turn, the inner skin formed by a plurality of U-shaped members can be metallic or it is obtained from a composite material or plastic. When the inner skin is metallic, this is joined to the stringer by fastening means like rivets or bolts. When the inner skin is a composite, it can be bonded, secondary bonded or co-cured with the stringers, preferable when they are also made of composite. In case of plastic, this bonding can be performed by ultrasonic welding, laser, or other process for plastic bonding.

Another aspect of the invention refers to a manufacturing method for producing leading edge sections with laminar flow control, wherein the method comprises the steps of providing a perforated outer skin having a plurality of stringers integrally formed or joined with the outer skin, providing a perforated inner skin, and joining the inner skin with the stringers, such as suction chambers for the laminar flow control, are defined by a part of the outer skin, a part of the inner skin and a pair of stringers.

BRIEF DESCRIPTION OF THE DRAWINGS

Preferred embodiments of the invention, are henceforth described with reference to the accompanying drawings, in which.

DETAILED DESCRIPTION

Figure 1:
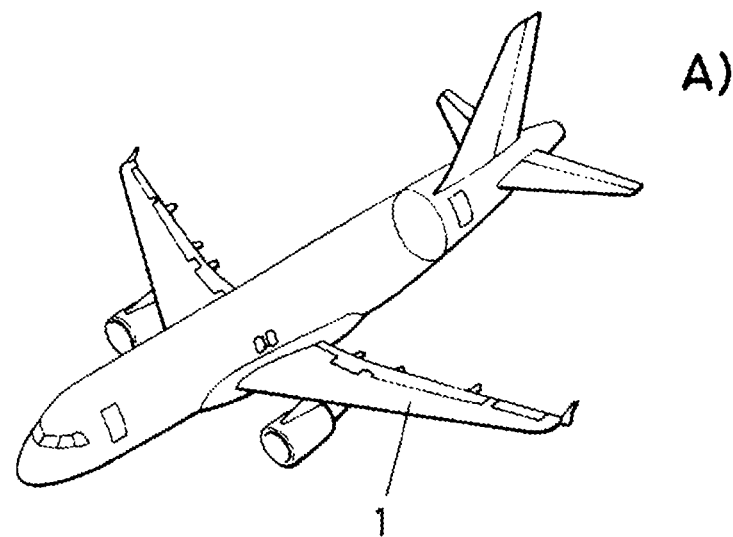
FIG. 1 shows a cross-sectional view of an schematic representation of a wing or lifting surface with a hybrid laminar flow configuration according to the prior art, wherein laminar and turbulent air flow is represented with thin lines on upper and lower surfaces.
Figure 1:
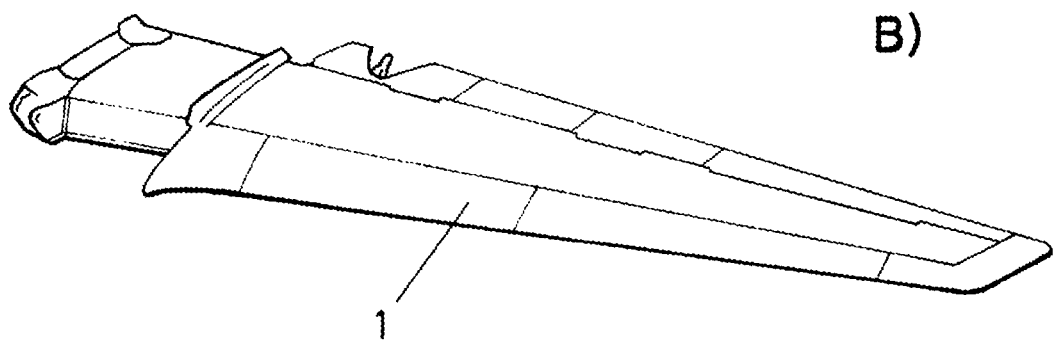
Figure 1:
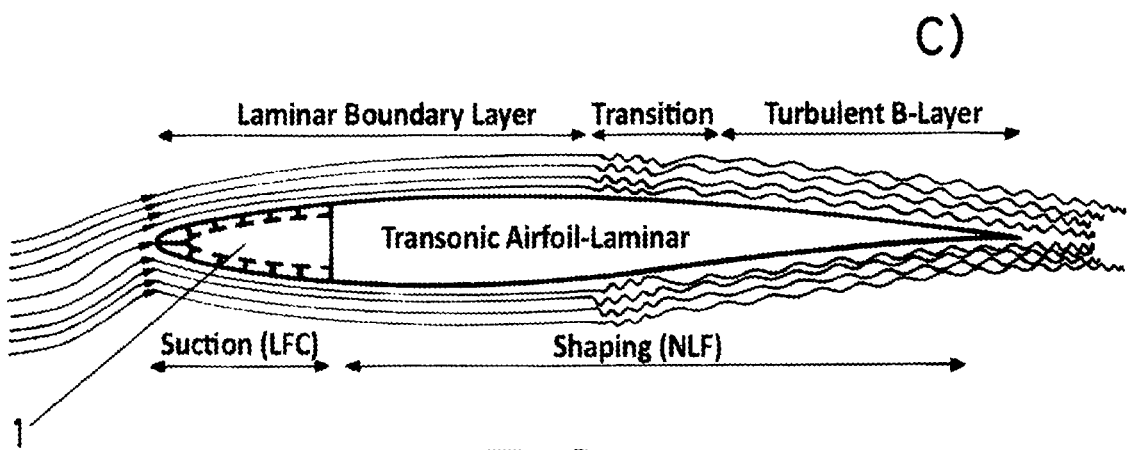
Figure 2:
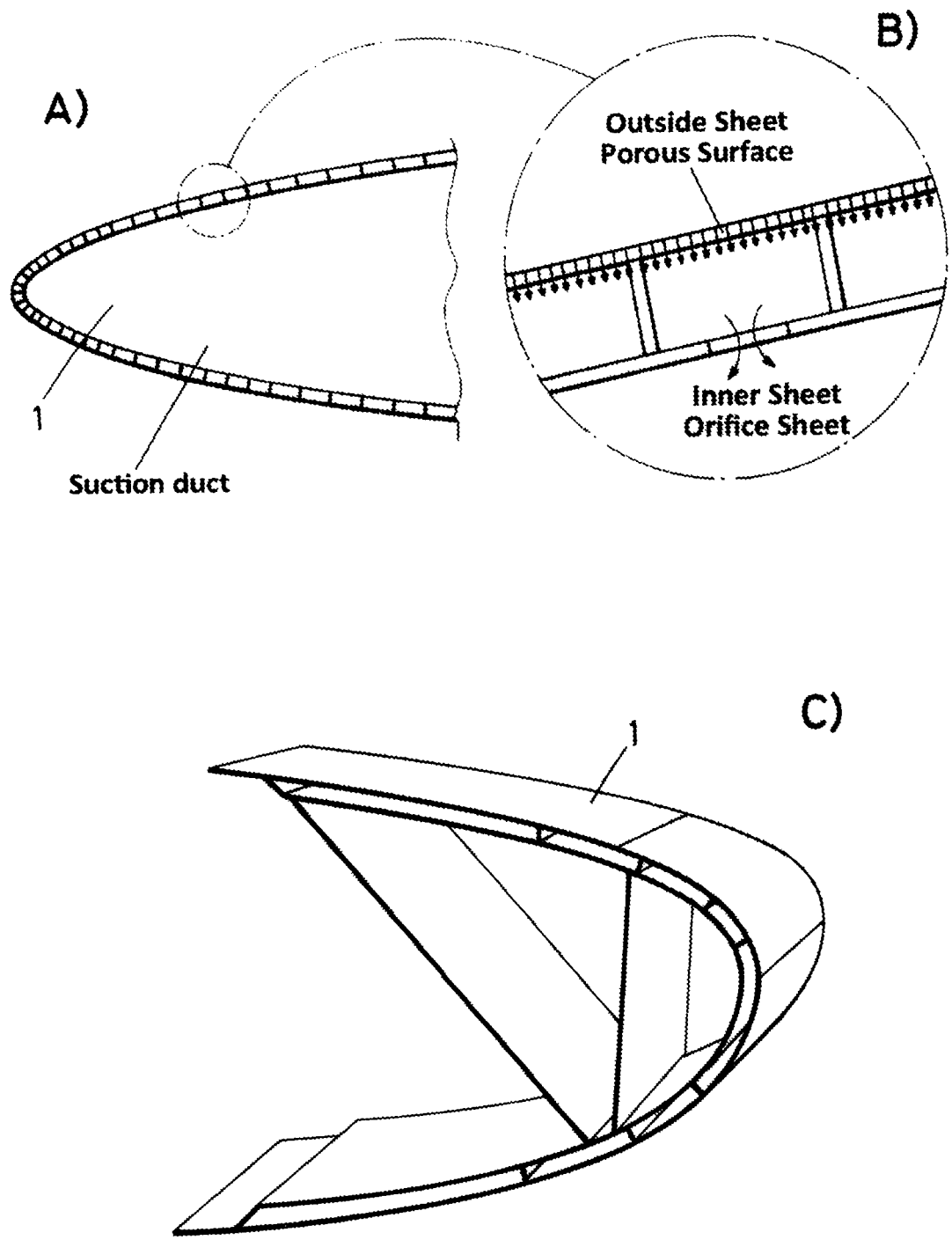
FIG. 2 shows a multi-chamber configuration of the leading edge section of a wing or lifting surface with laminar flow control, as the one shown in FIG. 1, wherein drawing (A) is a cross-sectional view, drawing (B) is an enlarged view of a detail of drawing (A), and drawing (C) is a perspective view.
Figure 3:
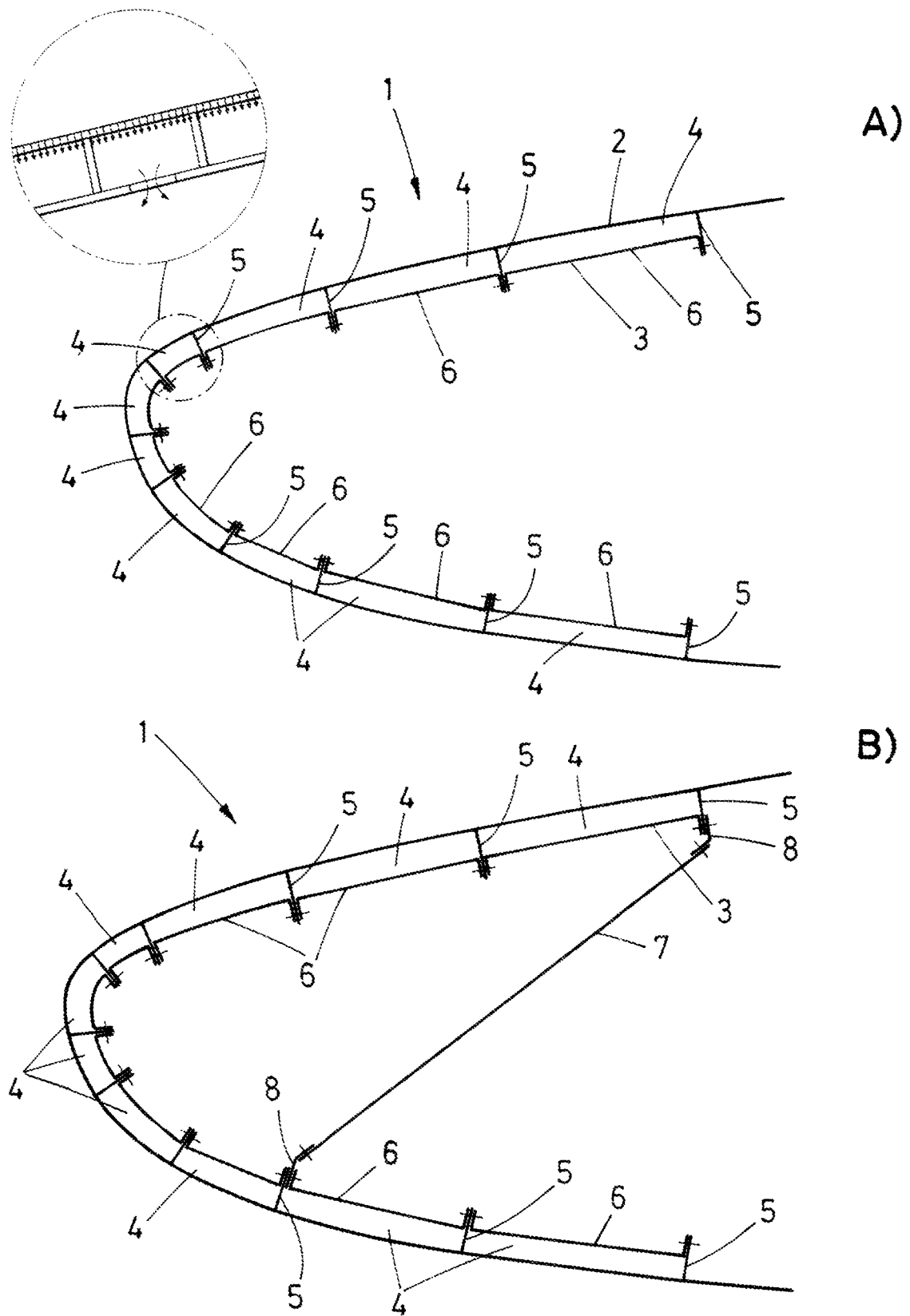
FIG. 3 shows two cross-sectional views of a leading edge section according to an embodiment of the invention, wherein the inner skin is formed by a plurality of the U-shaped members.

FIG. 3 shows a preferred embodiment of a leading edge section (1) according to the invention, integrating a laminar flow control system and comprising a perforated outer skin (2) shaped with an aerodynamic leading edge profile, and a perforated inner skin (3) internally arranged with respect to the outer skin (2) and configured with a leading edge profile similar to the one of the outer skin (2).

A plurality of individual suction chambers (4), are formed between the outer skin (2) and the inner skin (3). The suction chambers (4) extend span-wise at the leading edge section, and are consecutively arranged one after another following the profile of the leading edge, as shown in the cross-sectional view of FIG. 3). Therefore, for the laminar flow control system, an exterior region of the leading edge section is communicated with an interior region of the leading edge section, through said suction chambers (4).

The leading edge section (1) comprises a plurality of stringers (5) sized as structural elements and span-wise arranged at the leading edge section (1). These stringers (5) are integrally formed or joined with the outer skin (2), and may consist of T-shaped, I-shaped or l-shaped stringers, such one of the edges of the stringers is joined with the interior surface of the outer skin (2), and the other edge is provided for joining the inner skin (3), such as, when the inner skin (3) is joined to the free edge of the stringers (5), the suction chambers (4) are defined within a part of the outer skin (2), a part of the inner skin (3) and a pair of consecutive stringers (5).

In the preferred embodiment of FIG. 3, the inner skin (3) comprises a set of individual U-shaped members (6) (in a cross-sectional view) extending span-wise at the entire length of a leading edge section. Each member (6) has a two short sides and a perforated central side. The U-shaped members (6) are consecutively arranged one after another to configure the leading edge profile of the inner skin, and wherein a free edge of the stringers (5) is placed between two short sides of two consecutive or adjacent U-shaped members (6) as shown in FIG. 3. In this embodiment, preferably the stringers (5) have a flat web, for example the stringers are "T-shaped". Each stringer edge and the two short sides are overlapped are fastened together, for example they are bolted or riveted.

As it can be noted in FIG. 3, each U-shaped member (6) is dimensioned to fit in the space between two consecutive stringers (5), such as the two short sides of each member (6) overlap with corresponding consecutive stringers, so that they can be fastened together. If necessary to assure a proper sealing of the chambers, liquid sealant can be applied to the fastened areas.

If necessary, a spar (7) is fitted internally to the leading edge section as shown in drawing 3B, and for that purpose "L-shaped" brackets (8) are used to attach the spar (7) to the leading edge.

The outer skin (2) with integrated stringers (5) and the inner skin (3) of the embodiment of FIG. 3, can be manufactured with several combination of materials and manufacturing processes.

For example, the outer skin (2) and the stringers (5) can be metallic, and in this case the stringers (5) are welded to the outer skin (2) so it could be said that the stringers are integrated with the outer skin (2).

Alternatively, the outer skin (2) and the stringers (5) are obtained from a composite material like Carbon Fiber Reinforced Plastic (CFRP). In this case, the outer skin and the stringers are integrally formed, for example they are co-cured together, bonded, or secondary-bonded. Otherwise, outer skin and stringers can be obtained by means of a injection process using plastic (with or without reinforcements).

In turn, the inner skin (3) can be metallic or a composite, preferably (CFRP), but also made of plastic. Therefore, the U-shaped members (6) of FIG. 3, are metallic or a composite, or plastic.

When the inner skin (3) is metallic, this is bolted or riveted to the stringers (5), either in the case of metallic stringers or composite stringers. In this case, the inner skin (3) may be obtained from a cold formed aluminum sheet.

When the inner skin (3) and the outer skin (2) with integrated stringers (5) are all obtained from a composite material, the inner skin (3) can be riveted or bolted, co-cured, bonded or secondary-bonded with the stringers (5). In the case of plastic injection, the joining of "U" shaped parts and outer stiffened skin can be achieved by means of welding, but also by means of riveting.

Figure 4:
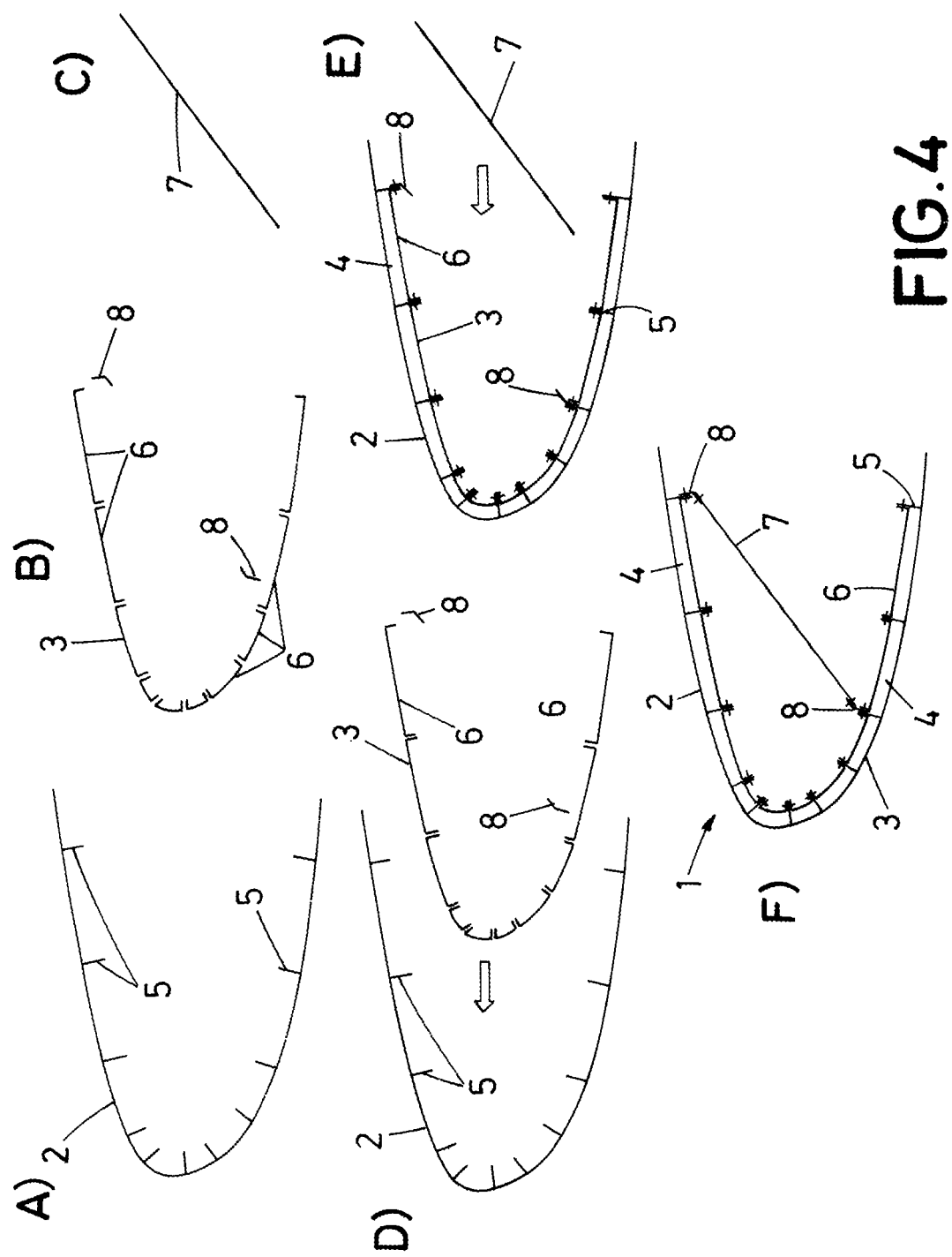
FIG. 4 shows a sequence of manufacturing steps for producing the leading edge section of FIG. 3.

A preferred manufacturing method of the leading edge section of FIG. 3, is shown in FIG. 4. An outer skin (2) having a plurality of stringers (5) integrally formed therein either from a metallic or a composite material, is conformed with the desired leading edge profile (drawing 4a), such as the stringers are span-wise arranged internally at the leading edge.

When the outer skin and the stringers are metallic, the outer skin can be obtained from a micro-drilled flat titanium sheet, and the stringers are laser-welded to that sheet, which is subsequently conformed with the desired shape.

When the outer skin and the stringers are obtained from a composite material, these components may consist of a CFRP dry carbon fiber outer skin with dry carbon fiber integrated stringers conformed with the desired shape, to which resin is co-injected in a Resin Transfer Molding (RTM) process. The leading edge section is finally cured and micro-drilled. In case of plastic injection, this structure is obtained by a single injection process.

Alternatively, the outer skin with integrated stringers, are conformed together as CFRP pre-pegs, which are subsequently cured together. Once the curing cycle is completed, the leading edge section is finally micro-drilled.

On the other hand, the inner skin (3) is obtained by conforming a plurality of individual U-shaped members (6), each one having two short sides and a central side (drawing 4b), wherein each central side is drilled individually. Then, the U-shaped members (6) are brought together with the stringers (drawing 4d), for example one by one, such as a free edge of the stringers is placed between two short sides of two consecutive U-shaped members (6).

The U-shaped members (6) are joined with the stringers (5) by means of fastening means (drawing 4e), such as the U-shaped members are consecutively arranged one after another to configure the desired shape for the inner skin (3), and to form the suction chambers (4).

If necessary, a metallic or composite spar (7) is also fitted to the leading edge structure be means of brackets (8).

It can be noted in view of FIG. 4, that one of the advantages of the invention is that the main components of the leading edge section, can be drilled before their assembly, such as the drilling process of the outer and inner skins are simplified. Additionally, the components can be easily inspected during production.

Other preferred embodiments of the present invention are described in the appended dependent claims and the multiple combinations of those claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A leading edge section with laminar flow control system comprising:
   a perforated outer skin shaped with an aerodynamic leading edge profile;
   a perforated inner skin internally arranged with respect to the outer skin;
   a plurality of suction chambers formed between the outer skin and the inner skin, such that an exterior region of the leading edge section is communicated with an interior region of the leading edge section through said plurality of suction chambers,
   wherein,
      the leading edge section further comprises a plurality of stringers span-wise arranged at the leading edge section, and integrally formed with the outer skin,
      the inner skin is joined to the stringers, such that each of the plurality of suction chambers is defined by a part of the outer skin, a part of the inner skin and a pair of consecutive stringers of the plurality of stringers, and
      the inner skin comprises a set of individual U-shaped members, each of the set of individual U-shaped members having a perforated central side and two sides extending from the perforated central side such that each of the two sides overlap an adjacent one of the plurality of stringers when the inner skin is joined to the plurality of stringers, wherein the U-shaped members are consecutively arranged one after another to configure an inner skin shape, and wherein a free edge of each of the plurality of stringers is placed between two sides of two consecutive U-shaped members and is fastened to said two sides, and for each of the set of individual U-shaped members, the perforated central side is proximal to the perforated outer skin and the two sides extend away from the perforated outer skin.

2. The leading edge section according to claim 1, wherein the outer skin and the plurality of stringers are metallic, and wherein the plurality of stringers are welded to the outer skin.

3. The leading edge section according to claim 1, wherein the outer skin and the plurality of stringers includes a Fiber Reinforced Composite material, and wherein the outer skin and the plurality of stringers are co-cured together.

4. The leading edge section according to claim 1, wherein the inner skin is metallic, and is fastened to the plurality of stringers.

5. The leading edge section according to claim 1, wherein the inner skin includes a Fiber Reinforced Composite material, and is bonded, secondary bonded or co-cured with the plurality of stringers.

6. A method for manufacturing a leading edge section integrating a laminar flow control system, in which an exterior region of the leading edge section is communicated with an interior region of the leading edge section through a plurality of suction chambers, the method comprising:

providing an outer skin having a plurality of stringers integrally formed with the outer skin, such that the stringers are span-wise arranged internally at the leading edge;

providing a perforated inner skin by conforming a plurality of individual U-shaped members, each of the plurality of individual U-shaped members having a central side and two sides extending from the central side such that each of the two sides overlap an adjacent one of the plurality of stringers when the inner skin is joined with the plurality of stringers, and arranging the U-shaped members consecutively one after another and joining the U-shaped members with the stringers by fastening means, such that a free edge of each of the plurality of stringers is placed between two sides of two consecutive U-shaped members; and joining the inner skin with the plurality of stringers, such that each of the plurality of suction chambers is defined by a part of the outer skin, a part of the inner skin and a pair of consecutive stringers of the plurality of stringers, wherein, for each of the set of individual U-shaped members, the central side is proximal to the perforated outer skin and the two sides extend away from the outer skin.

7. The method according to claim 6, further comprising perforating the outer skin before joining the inner skin, or after joining the inner skin.

8. The method according to claim 6, wherein the outer skin and the stringers are metallic, and wherein the outer skin is provided by laser welding the plurality of stringers on a surface of a substantially flat metallic panel, perforating the panel and conforming the panel with the plurality of integrated stringers to configure the outer skin with an aerodynamic leading edge profile.

9. The method according to claim 6, wherein the outer skin and the plurality of stringers have been obtained from a Fiber Reinforced Composite material, and wherein the outer skin and the plurality of stringers are co-cured together.

* * * * *